UNITED STATES PATENT OFFICE.

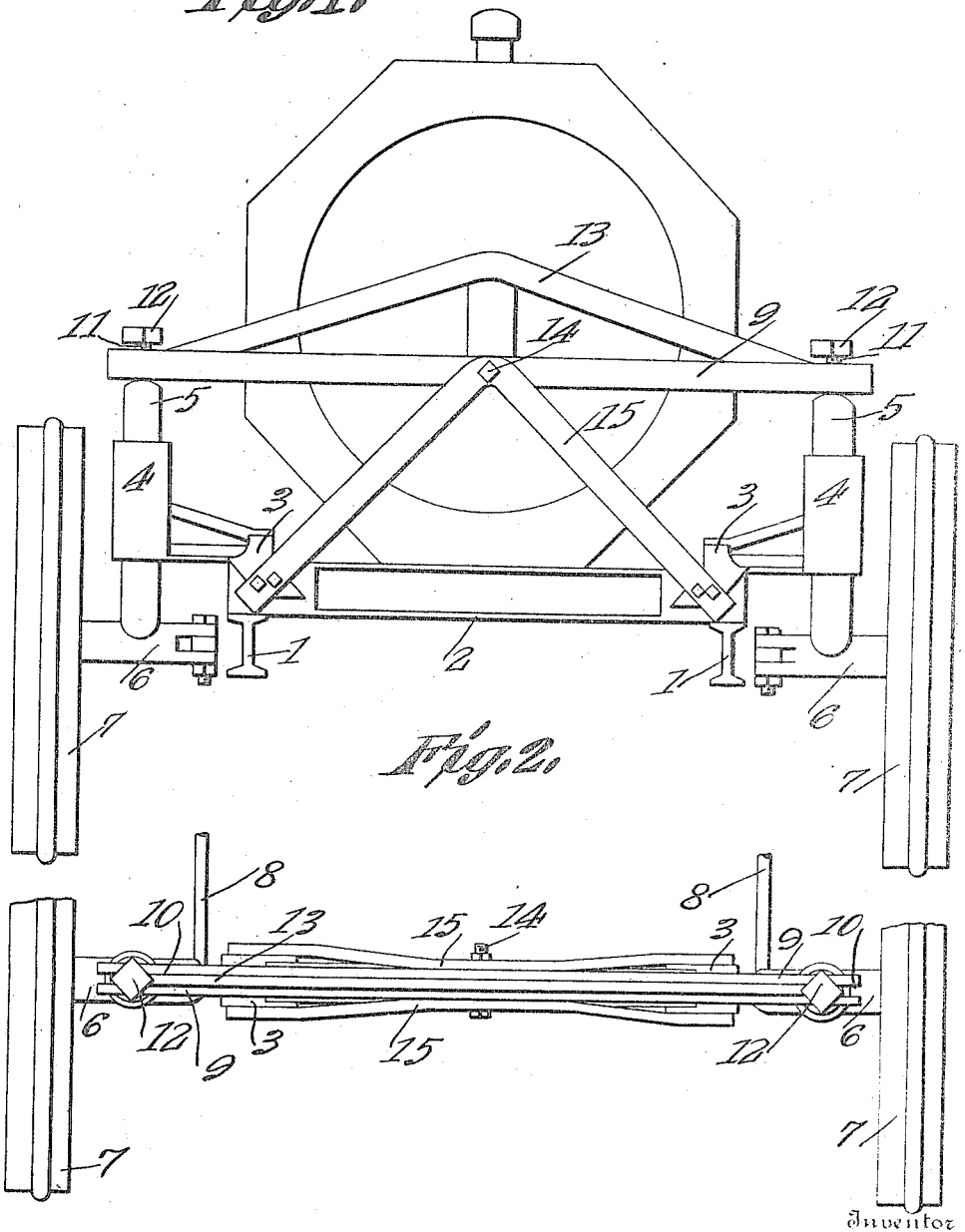

WILHELM G. DANIELSEN, OF INDEPENDENCE, MISSOURI.

EQUALIZER FOR TRACTORS.

1,266,773.  Specification of Letters Patent.  Patented May 21, 1918.

Application filed April 27, 1917. Serial No. 164,990.

*To all whom it may concern:*

Be it known that I, WILHELM G. DANIELSEN, a citizen of the United States, residing at Independence, in the county of Jackson and State of Missouri, have invented a new and useful Equalizer for Tractors, of which the following is a specification.

This invention relates to equalizers for use in connection with tractors, one of the objects of the invention being to provide means whereby the front supporting wheels of a tractor are free to shift upwardly and downwardly relative to each other, thus to adapt themselves to different elevations without causing the tractor to tilt or causing either of the wheels to leave the ground when passing over an obstruction or depression.

A further object is to provide an equalizer of this character which is simple, durable and efficient and will not readily get out of order.

Another object is to provide an equalizer which can be used in connection with the front or steering wheels, it being possible to shift said wheels as ordinarily for the purpose of steering the tractor.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a front elevation of a tractor having the present improvements combined therewith.

Fig. 2 is a plan view of the equalizer, adjacent parts being removed.

Referring to the figures by characters of reference 1 designates the sides of the chassis of a tractor, the same supporting a front beam 2 extending transversely. Secured to the ends of the beam 2 are brackets 3 which extend laterally beyond the beam and support, at their outer ends, upstanding guide sleeves 4. In each of these sleeves is mounted to slide and rotate a stem 5 extending upwardly from a spindle 6 on which one of the wheels 7 is mounted. The inner end of the spindle is pivotally attached to a rod 8 connected to steering mechanism not shown. Thus it will be seen that the two rods 8 can be utilized for the purpose of swinging the spindles 6 about the longitudinal axes of the stems 5 thus to move the wheels 7 and cause the tractor to travel in a desired direction. This adjustment of the spindles 6 can be effected independently of the up and down movement of the stems 5 within the sleeves 4.

The upper ends of the stems 5 are preferably rounded and are contacted by the ends of a beam 9, said ends being forked as shown particularly at 10, so as to loosely receive bolts 11 extending upwardly from the stems 5 and having heads 12 which serve to prevent the stems from dropping out of engagement with the beam 9. Said beam 9 may be provided with a suitable truss 13 for reinforcing it longitudinally. The middle portion of the beam is fulcrumed on a bolt 14 connecting two upstanding V-shaped standards 15 which are inverted and the terminals of which are attached to the end portions of the beam 2.

It will be apparent that the weight of the front end of the chassis will be suspended through the standards 15 from the bolts 14 and then be distributed through the beam 9 to the two stems 5 and the wheels 7. Should one of the wheels 7 move downwardly, as when passing over a depression, the corresponding end of the beam 9 would move downwardly under the weight of the tractor but the tractor would remain horizontal, the sleeve 4 at the raised side of the tractor sliding downwardly on the stem 5 therein.

By connecting the tractor to the wheels in the manner described, the wheels can pass over obstructions or depressions and the load will always be equalized upon both wheels irrespective of any irregularities in the contour of the supporting surface. Furthermore the tractor will not tilt laterally but will be maintained on lines extending substantially horizontally from side to side.

What is claimed is:—

The combination with a vehicle frame and a standard secured at the ends thereof and converging upwardly to a point above the center of the end of the frame, of a beam fulcrumed between its ends upon the upper end of the standard and extending laterally beyond the frame; brackets secured upon the sides of the frame close to the ends of the standard, vertical guides carried by the brackets and close to and above the sides of the frame, stems slidably mounted within the guides and supporting the ends of the beam, spindles movable with the stems and extending laterally upon the lower ends thereof, said spindles being arranged above the bottom of the frame, supporting wheels engaging the spindles, and means on the stems and coöperating with the ends of the beam for holding the stems against downward displacement relative to the beam.

In testimony that I claim the foregoing as my own, I have hereto affixed my signature in the presence of two witnesses.

WILHELM G. DANIELSEN.

Witnesses:
   E. O. BURTON,
   HARRY BUTLER.

Copies of this patent may be obtained for five cents each, by addressing the "Commissioner of Patents, Washington, D. C."